July 4, 1961  F. L. CARSON  2,990,969
ELECTRICAL JUNCTION BOX
Filed Sept. 4, 1959

INVENTOR
FORREST L. CARSON
ATTORNEY

United States Patent Office
2,990,969
Patented July 4, 1961

2,990,969
ELECTRICAL JUNCTION BOX
Forrest L. Carson, Box 1594, Borger, Tex.
Filed Sept. 4, 1959, Ser. No. 838,151
10 Claims. (Cl. 220—3.6)

The present invention relates to an electrical junction box, and more particularly to such a box having at least one clamping lever that is rotated into clamping position upon movement of the box, or a part of the box.

In the construction of houses and similar structures, it is common practice to erect the walls of wallboard, or of plaster, and to thereafter cut holes in the wall thus erected for the insertion of electrical junction boxes. These boxes are well-known and are used to contain, usually, switches or electric outlet plugs.

In order to facilitate the placement of the electrical junction boxes in the wall, prior workers in the art have provided various types of attaching means for the boxes; however, these prior attempts have not satisfactorily solved the problem since they had certain deficiencies therein, it being understood that the prior solutions offered had one or more of such deficiencies.

In particular, many of the known junction box constructions provided screws which either screwed into the wall or held or actuated clamping jaws, or performed some analogous function. As these boxes must be shipped to the construction sites, the normal handling often loosens the screws and causes them to become disassociated from the part of the box to which they were pertinent. As a consequence, considerable difficulty was encountered in locating the several loose parts of the box and in then placing and rotating the screws as necessary in order to secure the boxes in place.

A similar deficiency is present in another type of construction in which small spring clips are utilized, these spring clips being easily lost and difficult to handle.

Others of the prior art junction boxes were not adaptable to different wall thicknesses in the sense that a particular junction box could be used with walls of differing thicknesses, and thus required a different "size" of box for each different size wall. Still other solutions to the problem provided only a limited number of specific thickness adjustments, and suffered from the further disadvantage of providing only a knife edge type of engagement with the wall. Since the widely used plasterboard type of wall will easily crumble under a knife-like engagement, this solution was also unsatisfactory.

An object of the present invention is to provide an electrical junction box that may be readily mounted in a wall.

Another object of the present invention is the provision of an electrical junction box that has no small attaching devices that may become lost.

A further object of the present invention is to provide an electrical junction box that is utilizable with different thicknesses of wall, such as occur in wallboard construction.

A still further object of the present invention is the provision of an electrical junction box that may be attached by simple pushing movement of a part or parts thereof.

Yet another object of the present invention is to provide an electrical junction box that may be wired prior to installing the box in the wall.

Other objects and the nature and advantages of the instant invention will be apparent from the following description taken in conjunction with the accompanying drawings, wherein.

Figure 1:
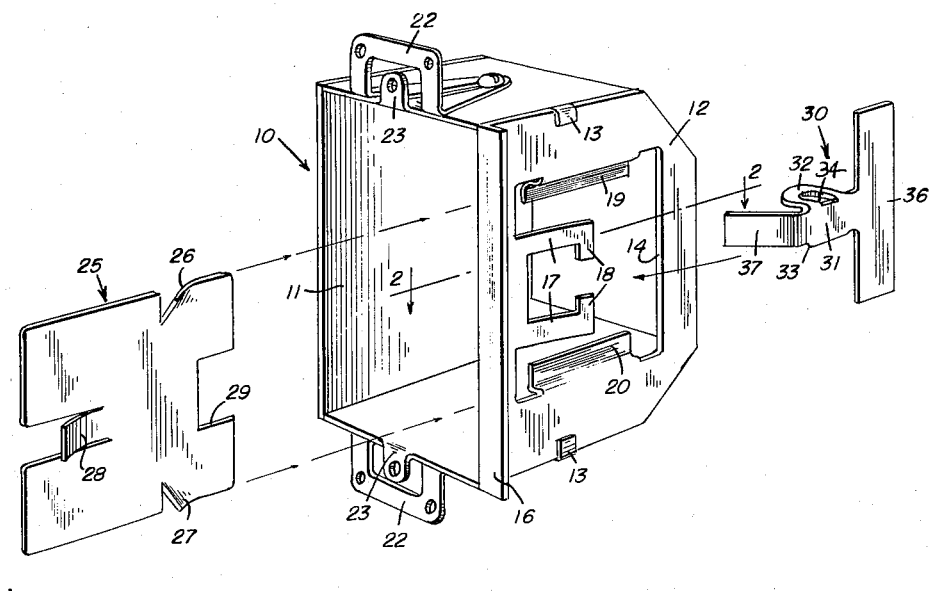
FIG. 1 is a perspective, exploded view of a junction box in accordance with the present invention.

Referring now to the drawings, wherein like reference characters are used to designate like or corresponding parts throughout the several views, there is shown in FIG. 1 an electrical junction box 10 having an open front 11. The top, bottom and rear walls are of known construction, as is one of the side walls. However, side wall 12 is peculiarly formed and configured in accordance with the present invention, and it will be understood that the side wall 12 may be either a separate plate attachable to the box, as by bent-over ears 13, or may be made an integral part of the box during the manufacture thereof.

Side wall 12 has a relatively large and generally rectangular aperture 14 therein and a flange 16 at the front edge thereof that extends outwardly.

A pair of spaced, parallel rearwardly extending arms 17 may be seen extending into the aperture 14, these arms having their rear free ends positioned slightly outwardly of the plane of side wall 12. At their free ends, the arms 17 have opposed fingers 18, these fingers extending towards each other. Due to the rearward inclination of the arms 17, the fingers 18 lie slightly outside of the plane of side wall 12. The fingers 18 extend generally parallel to the plane of the side wall and are also parallel to the front of the box. The side wall 12 is made of a metal that is somewhat resilient, and accordingly, the arms 17, which are integral with the side wall 12, are also somewhat resilient.

A pair of opposed guides 19, 20 are provided, these guides being integral with side wall 12. Guide 20 extends upwardly from the lower edge of aperture 14 and guide 19 extends downwardly from the upper edge thereof; these guides 19 and 20 are offset, and thereby are spaced inwardly of the plane of side wall 12.

Outstanding ears 22 and 23 may be provided on the upper and lower walls of the box, for attachment of the switch or electrical outlet to the box, in known fashion.

An operating plate 25 is provided, plate 25 being of the proper thickness to slide in the guides 19 and 20 and being of sufficient height to extend between these guides with a loose, sliding fit. The plate 25 is preferably of a length equal to the distance between the rear wall of box 10 and the front face thereof. Outwardly bent ears 26 and 27 are provided at the upper and lower edges of plate 25, and an inwardly bent and forwardly facing ear 28 is provided at the forward end of plate 25. At its rear, the plate 25 has a centrally disposed notch 29.

A clamping lever 30 is provided which is generally T-shaped. Lever 30 comprises a first arm 31 having a pair of spaced flanges 32, 33 extending transversely of one end thereof. Flanges 32 and 33 have a pair of aligned holes therein, hole 34 of flange 32 being visible in FIG. 1. Arm 31 has at the end thereof opposite the flanges 32, 33 a cross part 36, and extending from arm 31 adjacent flanges 32 and 33 is a second arm 37 that may be seen to be bent so as to lie in a different plane from arm 31 and cross part 36.

The electrical junction box 10 is assembled so that the fingers 18 extend through the holes in flanges 32 and 33, to thereby pivotally attach the clamping lever 30 to the side wall 12. In addition, operating plate 25 is positioned slidably in guides 19 and 20, and is prevented from becoming separated from the side wall 12 because of the action of ears 26 and 27 engaging the front edge of aperture 14, on either side of the arms 17.

Figure 2:
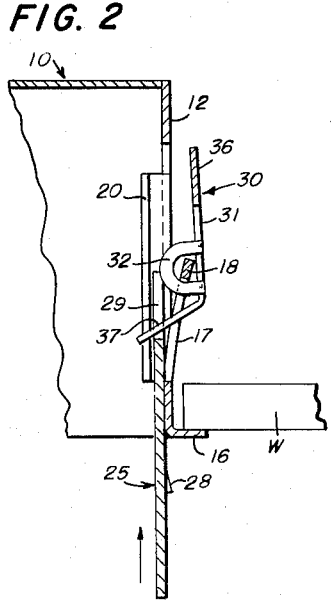
FIG. 2 is a cross-sectional view taken on the line 2—2 of FIG. 1, of the assembled electrical junction box and showing the first installation step.
Figure 3:
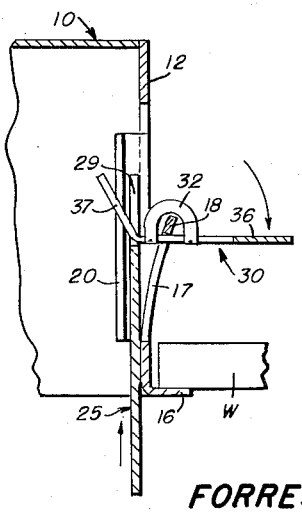
FIG. 3 is a cross-sectional view similar to FIG. 2, and showing the parts in an intermediate position.

When the electrical junction box 10 is to be mounted in a wall W, a suitable opening is prepared in the wall in the usual manner. Thereafter, the clamping lever 30 is positioned as shown in FIG. 2, with the cross part 36 towards the rear of side wall 12, and extending on the outside thereof and parallel thereto. The second arm 37 of lever 30 extends across the space between the arm 17 towards the interior of the box, and extends sufficiently far into the interior of the box that it crosses the plane of operating plate 25. Operating plate 25 is in its outer position, being as far out of the box as is permitted by the engagement of the ears 26 and 27 with the front edge of aperture 14, ear 27 being shown in FIG. 2. Also, the vertical edge of notch 29 may be seen to be adjacent to the second arm 37.

Upon pushing of the operating plate 25 towards the rear of the box, the edge of notch 29 will engage with the second arm 37 and will begin to rotate the clamping lever 30 so that the cross part 36 thereof swings towards the wall W.

As the operating plate 25 continues its movement the clamping lever 30 will continue to rotate on the fingers 18. Finally, the rear edge of operating plate 25 will strike against the rear wall of box 10, and clamping lever 30 will be in its fully rotated position with the cross part 36 thereof being in engagement with the rear surface of wall W, being on the opposite side thereof from the flange 16. Thus, the cross part 36 and the flange 16 clamp the wall W between them, to thereby secure the electrical junction box 10 to the wall W.

The outer side of operating plate 25 may be seen to be in engagement with the clamping lever 30 substantially at the juncture of arms 31 and 37. Due to the resilient nature and configuration of arms 17, the fingers 18 and the lever 30 carried thereby may swing or yield as necessary in order to accommodate the position of cross part 36 to different thicknesses of walls.

Figure 4:
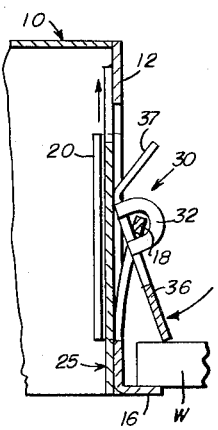
FIG. 4 is a cross-sectional view similar to FIG. 2, showing the junction box of FIG. 1 completely installed.

Once the operating plate 25 has been placed in the position shown in FIG. 4, the ear 28 adjacent the front thereof will move into position relative to the edge of aperture 14 between the arms 17, and thus withdrawal of operating lever 25 is thereby prevented.

As will be recognized from the above description, the junction box 10 may be shipped completely assembled, with no small extraneous parts to become loose and lost. The electrical junction box 10 may be inserted through a suitably prepared aperture in a wall in one simple movement, and it is only necessary to slide the operating plate home in order to securely clamp the electrical junction box 10 to the wall, the spring action of the arms 17 accommodating the box 10 to varying wall thicknesses.

It will be obvious to those skilled in the art that various changes may be made without departing from the spirit of the invention and therefore the invention is not limited to what is shown in the specification but only as indicated in the appended claims.

What is claimed is:

1. An electrical junction box for attachment to a wall in an opening thereof, said box having an open front and comprising a side wall having a large generally rectangular aperture therein and a flange extending outwardly at the front thereof, a pair of aligned fingers extending into said aperture, said fingers lying slightly outside the plane of said side wall and extending parallel to the plane of the side wall and to the front of the box, a pair of opposed guides extending upwardly from the lower edge of said aperture and downwardly from the upper edge thereof, respectively, said guides being offset inwardly of said side wall, an operating plate slidable in said guides, said plate having a centrally disposed notch at the rear thereof, outwardly bent ears on the upper and lower edges thereof engageable with the front edge of said aperture, and an outwardly bent forwardly facing ear at the front thereof, a clamping lever comprising a first arm having a pair of spaced flanges extending transversely of one end thereof, said flanges having aligned holes therein, each said hole receiving one of said fingers therethrough to thereby pivotally support said lever on said box, said first arm having an integral cross part at the other end thereof generally parallel to and outside said side wall, and a second arm connected to said one end of said first arm and at an angle thereto, said arms lying in a plane perpendicular to said side wall, and said second arm extending across the plane of said operating plate when said first arm extends rearwardly of said box from said fingers, whereby upon rearward sliding movement of said operating plate said lever will rotate to bring said cross part into engagement with the rear of a wall through a hole in which said box has been inserted.

2. An electrical junction box for attachment to a wall in an opening thereof, said box having an open front and comprising a side wall having a large generally rectangular aperture therein and a flange extending outwardly at the front thereof, a pair of aligned fingers extending into said aperture, said fingers lying slightly outside the plane of said side wall and extending parallel to the plane of the side wall and to the front of the box, a pair of opposed guides extending upwardly from the lower edge of said aperture and downwardly from the upper edge thereof, respectively, said guides being offset inwardly of said side wall, an operating plate slidable in said guides, a clamping lever comprising a first arm having a pair of spaced flanges extending transversely of one end thereof, said flanges having aligned holes therein, each said hole receiving one of said fingers therethrough to thereby pivotally support said lever on said box, said first arm having an integral cross part at the other end thereof generally parallel to and outside said side wall, and a second arm connected to said one end of said first arm and at an angle thereto, said arms lying in a plane perpendicular to said side wall, and said second arm extending across the plane of said operating plate when said first arm extends rearwardly of said box from said fingers, whereby upon rearward sliding movement of said operating plate said lever will rotate to bring said cross part into engagement with the rear of a wall through a hole in which said box has been inserted.

3. An electrical junction box for attachment to a wall in an opening thereof, said box having an open front and comprising a side wall having a large generally rectangular aperture therein, a pair of aligned fingers extending into said aperture, said fingers lying slightly outside the plane of said side wall and extending parallel to the plane of the side wall and to the front of the box, a pair of opposed guides extending upwardly from the lower edge of said aperture and downwardly from the upper edge thereof, respectively, said guides being offset inwardly of said side wall, an operating plate slidable in said guides, a clamping lever comprising a first arm having a pair of spaced flanges extending transversely of one end thereof, said flanges having aligned holes therein, each said hole receiving one of said fingers therethrough to thereby pivotally support said lever on said box, said first arm having an integral cross part at the other end thereof generally parallel to and outside said side wall, and a second arm connected to said one end of said first arm and at an angle thereto, said arms lying in a plane perpendicular to said side wall, and said second arm extending across the plane of said operating plate when said first arm extends rearwardly of said box from said fingers, whereby upon rearward sliding movement of said operating plate said lever will rotate to bring said cross part into engagement with the rear of a wall through a hole in which said box has been inserted.

4. An electrical junction box for attachment to a wall in an opening thereof, said box having an open front and comprising a side wall having a large generally rectangular aperture therein, a pair of aligned fingers extending into said aperture, said fingers lying slightly outside the plane of said side wall and extending parallel to the plane of the side wall and to the front of the box, a pair of opposed guides extending upwardly from the lower edge of said aperture and downwardly from the upper edge thereof, respectively, said guides being offset inwardly of said side wall, an operating plate slidable in said guides, a clamping lever comprising a first arm having a pair of spaced flanges extending transversely of one end thereof, said flanges having aligned holes therein, each said hole receiving one of said fingers therethrough to thereby pivotally support said lever on said box, said first arm having an integral cross part at the other end thereof generally parallel to and outside said side wall, and a second arm connected to said one end of said first arm, said arms lying in a plane perpendicular to said side wall, and said second arm extending across the plane of said operating plate when said first arm extends rearwardly of said box from said fingers, whereby upon rearward sliding movement of said operating plate said lever will rotate to bring said cross part into engagement with the rear of a wall through a hole in which said box has been inserted.

5. An electrical junction box for attachment to a wall in an opening thereof, said box having an open front and comprising a side wall having a large generally rectangular aperture therein, a pair of aligned fingers extending into said aperture, said fingers lying slightly outside the plane of said side wall and extending parallel to the plane of the side wall and to the front of the box, a pair of opposed guides integral with said side wall and extending upwardly from the lower edge of said aperture and downwardly from the upper edge thereof, respectively, said guides being offset inwardly of said side wall, an operating plate slidable in said guides, a clamping lever comprising a first arm pivotally supporting said lever on said box, said first arm having an integral cross part at the other end thereof generally parallel to and outside said side wall, and a second arm connected to said one end of said first arm, said arms lying in a plane perpendicular to said side wall, and said second arm extending across the plane of said operating plate when said first arm extends rearwardly of said box from said fingers, whereby upon rearward sliding movement of said operating plate said lever will rotate to bring said cross part into engagement with the rear of a wall through a hole in which said box has been inserted.

6. An electrical junction box for attachment to a wall in an opening thereof, said box having an open front and comprising a side wall having a large generally rectangular aperture therein, a pair of aligned fingers extending into said aperture, said fingers lying slightly outside the plane of said side wall and extending parallel to the plane of the side wall and to the front of the box, a pair of opposed guides extending upwardly from the lower edge of said aperture and downwardly from the upper edge thereof, respectively, said guides being offset inwardly of said side wall, an operating plate slidable in said guides, a clamping lever comprising a first arm pivotally supporting said lever on said box, and a second arm connected to said one end of said first arm, said arms lying in a plane perpendicular to said side wall, and said second arm extending across the plane of said operating plate when said first arm extends rearwardly of said box from said fingers, whereby upon rearward sliding movement of said operating plate said lever will rotate to bring said cross part into engagement with the rear of a wall through a hole in which said box has been inserted.

7. An electrical junction box for attachment to a wall in an opening thereof, said box having an open front and comprising a side wall having a large aperture therein, a pair of aligned fingers extending into said aperture, said fingers extending parallel to the front of the box, a pair of opposed guides extending upwardly from the lower edge of said aperture and downwardly from the upper edge thereof, respectively, said guides being offset inwardly of said side wall, an operating plate slidable in said guides, a clamping lever comprising a first arm pivotally supporting said lever on said box, and a second arm connected to said one end of said first arm, said arms lying in a plane perpendicular to said side wall, and said second arm extending across the plane of said operating plate when said first arm extends rearwardly of said box from said fingers, whereby upon rearward sliding movement of said operating plate said lever will rotate to bring said cross part into engagement with the rear of a wall through a hole in which said box has been inserted.

8. An electrical junction box for attachment to a wall in an opening thereof, said box having an open front and comprising a side wall having an aperture therein, generally vertically extending pivot means in juxtaposition with said aperture, guide means within and adjacent said side wall and extending rearwardly of said box, operating means slidable in said guide means, a clamping lever pivotally supported intermediate its ends on said pivot means and having a part thereof in the path of said operating means, whereby upon rearward sliding movement of said operating means said lever will be rotated to clamp said box into a wall opening.

9. The electrical junction box of claim 8, said pivot means being slightly outside said side wall.

10. The electrical junction box of claim 8, said lever being resilient.

References Cited in the file of this patent

UNITED STATES PATENTS

| | | |
|---|---|---|
| 1,793,187 | Neall | Feb. 17, 1931 |
| 2,126,259 | Howells | Aug. 9, 1938 |
| 2,233,731 | Budnick | Mar. 4, 1941 |
| 2,798,630 | Furnish | July 9, 1957 |